United States Patent
Nagasawa et al.

(10) Patent No.: US 7,141,939 B2
(45) Date of Patent: Nov. 28, 2006

(54) POWER SUPPLY CIRCUIT THAT IS STABLE AGAINST SUDDEN LOAD CHANGE

(75) Inventors: Takayuki Nagasawa, Kawasaki (JP); Shinji Yajima, Kawasaki (JP); Toshiyuki Teramoto, Kawasaki (JP); Shunsuke Fueki, Kawasaki (JP); Hiroshi Okubo, Hino (JP); Masayoshi Isobe, Hino (JP); Takeshi Kikuchi, Hino (JP); Andrzej Radecki, Tokyo (JP)

(73) Assignees: Fujitsu Limited, Kawasaki (JP); FFC Limited, Tokyo (JP)

( * ) Notice: Subject to any disclaimer, the term of this patent is extended or adjusted under 35 U.S.C. 154(b) by 0 days.

(21) Appl. No.: 10/896,080

(22) Filed: Jul. 22, 2004

(65) Prior Publication Data

US 2005/0168159 A1    Aug. 4, 2005

(30) Foreign Application Priority Data

Jan. 30, 2004    (JP)    ............................. 2004-023982

(51) Int. Cl.
*G05F 1/00*    (2006.01)
(52) U.S. Cl. .................. 315/291; 315/307; 315/DIG. 4
(58) Field of Classification Search ................ 235/492, 235/487; 363/141; 323/360; 315/194, 224, 315/225, 219, 209 R, 291, 307, DIG. 4
See application file for complete search history.

(56) References Cited

U.S. PATENT DOCUMENTS

| | | | | | |
|---|---|---|---|---|---|
| 5,872,429 | A | * | 2/1999 | Xia et al. | 315/194 |
| 6,140,771 | A | * | 10/2000 | Luger et al. | 315/101 |
| 6,515,919 | B1 | | 2/2003 | Lee | 365/192 |
| 6,659,352 | B1 | * | 12/2003 | Asada et al. | 235/492 |

FOREIGN PATENT DOCUMENTS

| | | |
|---|---|---|
| GB | 2 333 493 A | 7/1999 |
| GB | 1 089 217 A1 | 4/2001 |
| JP | 10-240889 | 9/1998 |
| JP | 2000-348152 | 12/2000 |
| JP | 2002-099887 | 4/2002 |
| JP | 2002-288615 | 10/2002 |
| WO | 00/41130 A | 7/2000 |

* cited by examiner

*Primary Examiner*—Tuyet Vo
*Assistant Examiner*—Jimmy Vu
(74) *Attorney, Agent, or Firm*—Arent Fox PLLC

(57) ABSTRACT

A power supply circuit for supplying power to a load includes an antenna which receives electric power, a rectifier coupled to the antenna and configured to convert an alternating voltage supplied from the antenna into a direct-current voltage, a voltage step-down circuit which steps down the direct-current voltage to generate an output voltage for provision to the load, a regulator which controls a resistance connected between the output voltage and a ground voltage in parallel with the load, thereby controlling a voltage level of the output voltage.

8 Claims, 15 Drawing Sheets

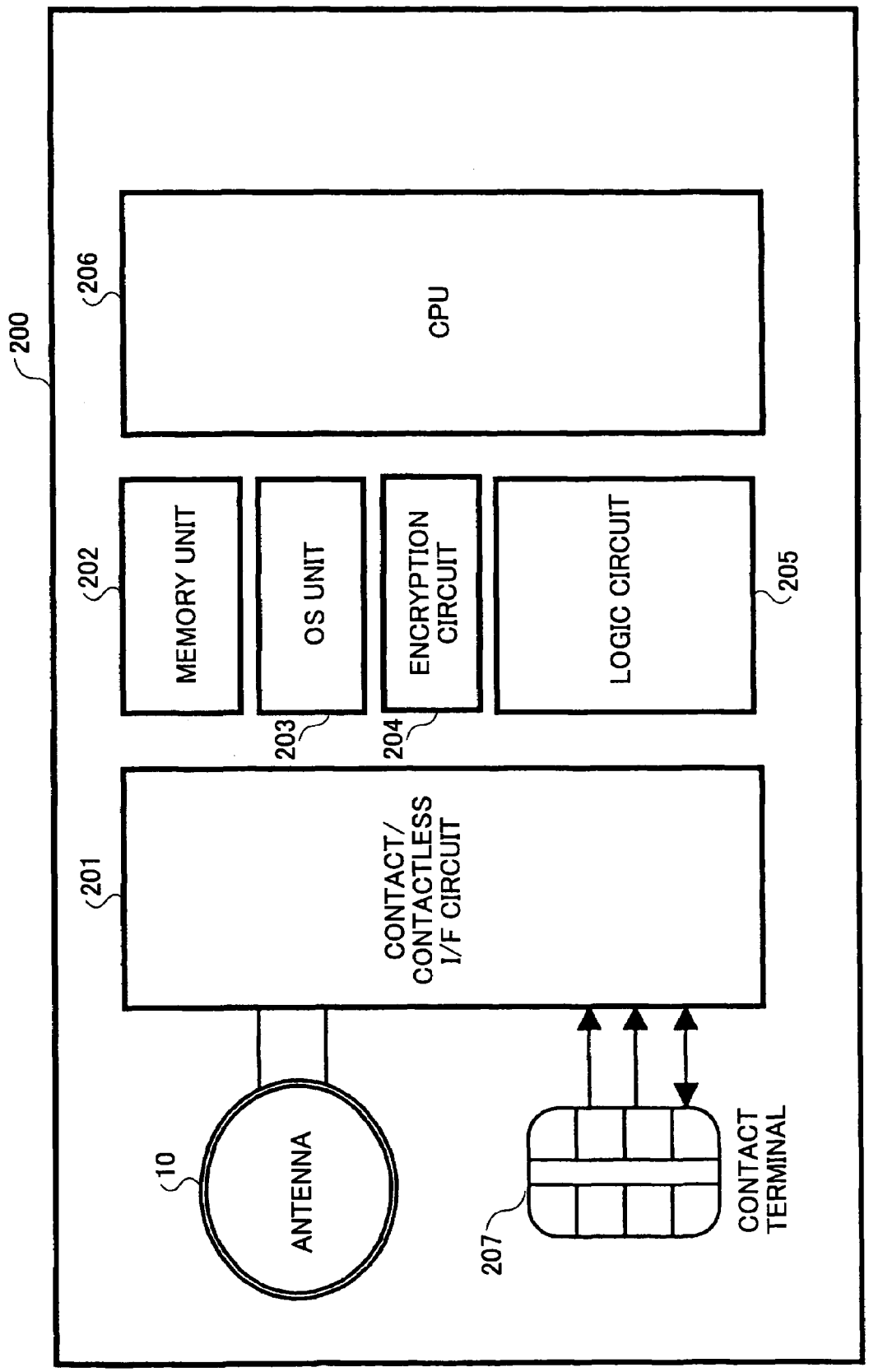

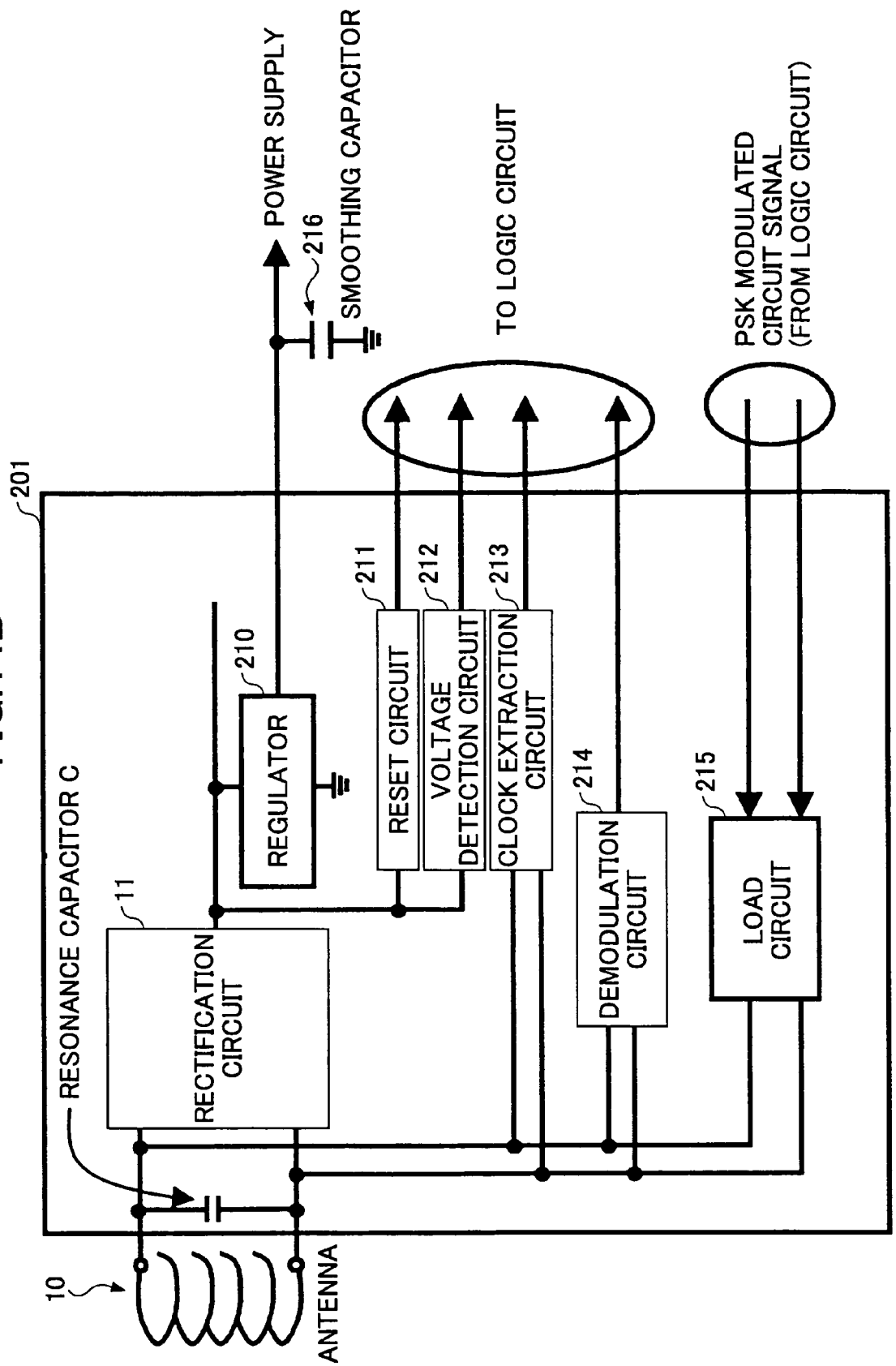

POWER SUPPLY CIRCUIT THAT IS STABLE AGAINST SUDDEN LOAD CHANGE

CROSS-REFERENCE TO RELATED APPLICATIONS

The present application is based upon and claims the benefit of priority from the prior Japanese Patent Application No. 2004-023982 filed on Jan. 30, 2004, with the Japanese Patent Office, the entire contents of which are incorporated herein by reference.

BACKGROUND OF THE INVENTION

1. Field of the Invention

The present invention generally relates to regulator circuits, and particularly relates to a regulator circuit used in an IC (integrated-circuit) card.

2. Description of the Related Art

An IC card is used in various industrial fields where information and data inside the card need to be exchanged with external devices, and is exemplified by a commuter pass, a basic resident register, a credit card, etc. A system for exchanging data with external devices includes a system using noncontact-antenna-based communication and a system using contact-node-based communication. A system for supplying power to drive circuitry inside the card includes a system based on a noncontact antenna and a system based on contact nodes.

In order to protect the security of information inside IC cards, functional improvements such as the provision of protection functions have been made, which necessitates a built-in CPU or the like in the IC card in addition to memories. Moreover, the fields of application have expanded, resulting in an increase of circuit size. As the circuit size increases inside the IC cards, power fluctuation caused by circuit operations becomes large, and required electric power also increases.

Accordingly, there is a need for a power supply that is capable of supplying stable, sufficient electric power even when a sudden change in the load occurs. FIG. 1 is block diagram showing an example of the construction of a related-art power supply circuit.

The power supply circuit of FIG. 1 includes an antenna 10, a rectifier 11, a digital volume 12, a series regulator 13, a capacitor C, and Zener diodes ZD1 and ZD2.

Electric power received at the antenna 10 is boosted by the operation of resonance effected by the inductance L of the antenna and the capacitor C connected in parallel, and is then supplied to the rectifier 11 as alternating voltage. The magnitude of resonance may become infinite if there is no load. The Zener diodes ZD1 and ZD2 are thus provided for the purpose of preventing excessive voltage.

The rectifier 11 converts the alternating voltage supplied from the antenna 10 into a direct-current voltage. The digital volume 12 serves as a pseudo load to adjust the input voltage VDP to a proper voltage level. The series regulator 13 attends to voltage control responsive to a load change, thereby supplying a constant direct-current voltage to the load.

In the case of making a contact, the antenna is not used, and power is supplied through terminals N1 and N2.

FIG. 2 is a circuit diagram showing a detailed circuit construction of the digital volume 12 and the series regulator 13 of FIG. 1.

In FIG. 2, the digital volume 12 includes resistors 21 and 22, an AD converter 23, transistors 24-0 through 24-$m$, resistors 25-0 through 25-$m$ having respective resistances R0 through R0/$2^m$, and a transistor 26. The series regulator 13 includes an operational amplifier 31, a transistor 32, resistors 33 and 34, and a transistor 35.

The resistors 21 and 22 divide a direct-current voltage VDP supplied from the rectifier 11 of FIG. 1. The AD converter 23 converts the divided potential into a digital value comprised of D0 through Dm, and controls the ON/OFF of the transistors 24-0 through 24-$m$ according to this digital value. With this provision, the resistors 25-0 through 25-$m$ having respective resistances R0, R0/2, ..., and R0/($2^m$) are selectively coupled to the voltage VDP according to the digital value. The adjustment of combined resistance is such that the higher the detected value of the direct-current voltage VDP, the lower the combined resistance is. This achieves control that maintains the voltage VDP at a constant level. The series regulator 13 generates a voltage VDDF lower than the voltage VDP in the manner as follows. The voltage VDDF is divided by the resistors 33 and 34, and the operational amplifier 31 compares the divided potential with a reference potential. The operational amplifier 31 controls the gate voltage to make the transistor 32 more conductive if the divided potential is lower than the reference potential, and controls the gate voltage to make the transistor 32 less conductive if the divided potential is higher than the reference potential. Such feedback control by the operational amplifier 31 makes the voltage VDDF constant.

A control signal, when its voltage level is low, turns off the transistor 35, thereby suspending the control function of the operational amplifier 31. When the voltage level of the control signal is high, the control function of the operational amplifier 31 is turned on.

[Patent Document 1]
Patent Application Publication No. 10-240889
[Patent Document 2]
Patent Application Publication No. 2000-348152
[Patent Document 3]
Patent Application Publication No. 2002-288615
[Patent Document 4]
Patent Application Publication No. 2002-99887

The related-art regulator circuit shown in FIG. 1 and FIG. 2 has drawbacks as follows.

In the regulator circuit shown in FIG. 1 and FIG. 2, the transistor 32, which is controlled by the operational amplifier 31 of the series regulator 13, is connected in series to the load. If an increase in the load causes the output voltage VDDF to drop, the transistor 32 is controlled to be more conductive, thereby increasing a supply current. If a decrease in the load causes the output voltage VDDF to rise, the transistor 32 is controlled to be less conductive, thereby decreasing a supply current. In this construction, the electric current flowing through the transistor 32 is controlled so as to change the electric current running through the load, thereby controlling the voltage. If the response speed of the operational amplifier 31 is increased, a difference of speed between voltage changes and feedback control becomes large. There may thus be a risk of letting the operational amplifier 31 oscillate. Because of this reason, it is difficult to cope with a sudden change in the load by enhancing the response speed of the operational amplifier 31.

Moreover, during the operation of the regulator circuit of FIG. 1 and FIG. 2, the digital value of the digital volume 12 is set as a given proper value. Electric wave received at the antenna 10 not only includes an electric wave for power-supply purposes, but also includes superimposed AM modulated signals for the purpose of communicating information necessary for the IC card. Therefore, the response speed of the digital volume 12 for keeping the voltage VDP constant is set to a sufficiently slow speed that would not absorb the modulated signals.

If the load connected to the voltage VDDF shows a sudden change, the control of the voltage VDDF by the operational amplifier 31 may not be sufficiently fast, resulting in the voltage VDP on the input side being changed. Since the response speed of the digital volume 12 is slow as described above, the voltage VDP is let drop, failing to maintain the constant voltage level.

Accordingly, there is a need for a power supply circuit that supplies stable power by keeping the input voltage VDP and the output voltage VDDF constant against a sudden change in the load.

SUMMARY OF THE INVENTION

It is a general object of the present invention to provide a power supply circuit that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by power supply circuit particularly pointed out in the specification in such full, clear, concise, and exact terms as to enable a person having ordinary skill in the art to practice the invention.

To achieve these and other advantages in accordance with the purpose of the invention, the invention provides a power supply circuit for supplying power to a load, the power supply circuit including an antenna which receives electric power, a rectifier coupled to the antenna and configured to convert an alternating voltage supplied from the antenna into a direct-current voltage, a voltage step-down circuit which steps down the direct-current voltage to generate an output voltage for provision to the load, a regulator which controls a resistance connected between the output voltage and a ground voltage in parallel with the load, thereby controlling a voltage level of the output voltage.

In the invention as described above, the above-noted resistance may be an on-resistance of a transistor, and the on-resistance of this transistor may be controlled by an operational amplifier operating in response to the output voltage. The on-resistance of the transistor is provided in parallel with the load. If an increase in the load causes the output voltage to drop, the transistor is controlled to be less conductive, thereby increasing an electric current supplied to the load. If a decrease in the load causes the output voltage to rise, the transistor is controlled to be more conductive, thereby decreasing an electric current supplied to the load. With this provision, the on-resistance of the transistor connected in parallel with the output voltage and serving as part of the load is changed, thereby controlling the output voltage appearing at one end of the transistor. The response speed of the operational amplifier can thus be increased to bring about a commensurate increase in the speed of voltage control. The operational amplifier thus does not oscillate.

In this manner, the construction of the invention makes it possible to cope with a sudden change in the load by increasing the response speed of the operational amplifier. It is thus possible to provide stable power by keeping the output voltage constant against sudden changes in the load. Since the output voltage does not change, further, it is possible to avoid the fluctuation of an input voltage responding to a change in the load.

BRIEF DESCRIPTION OF THE DRAWINGS

Other objects and further features of the present invention will be apparent from the following detailed description when read in conjunction with the accompanying drawings, in which:

FIGS. 14A and 14B are block diagrams showing the construction of an IC card in which the regulator of the invention is incorporated.

DESCRIPTION OF THE PREFERRED EMBODIMENTS

In the following, embodiments of the present invention will be described with reference to the accompanying drawings.

Figure 1:
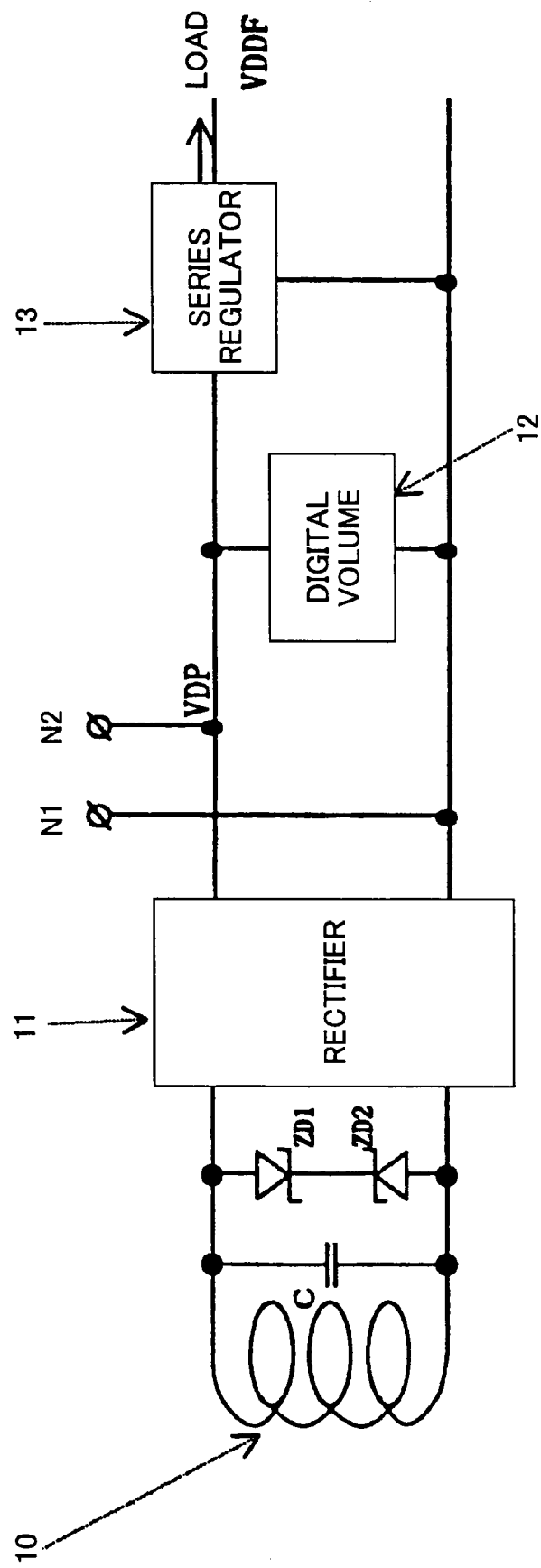
FIG. 1 is block diagram showing an example of the construction of a related-art power supply circuit.
Figure 2:
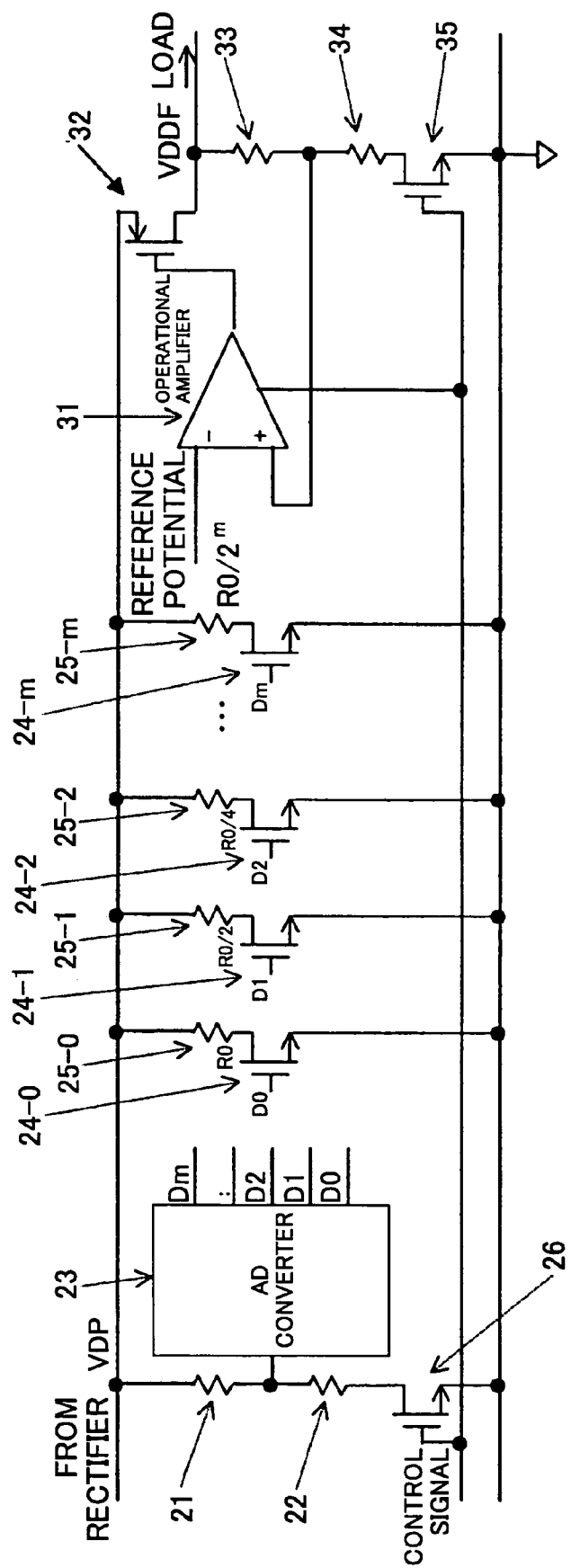
FIG. 2 is a circuit diagram showing a detailed circuit construction of the digital volume and the series regulator of FIG. 1.
Figure 3:
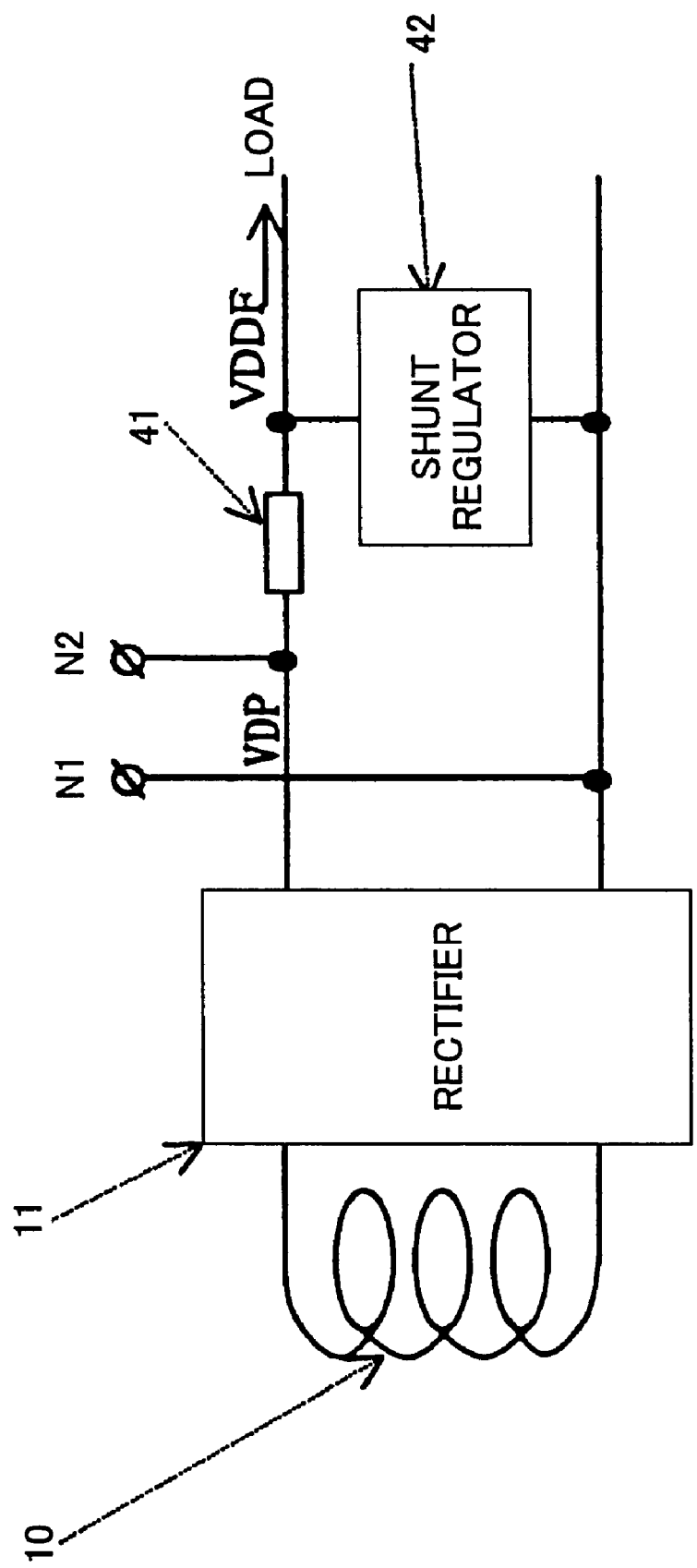
FIG. 3 is a block diagram showing a first embodiment of a power supply circuit according to the invention.

FIG. 3 is a block diagram showing a first embodiment of a power supply circuit according to the invention. In FIG. 3, the same elements as those of FIG. 1 are referred to by the same numerals, and a description thereof will be omitted.

The power supply circuit of FIG. 3 includes the antenna 10, the rectifier 11, a voltage step-down circuit 41, and a shunt regulator 42. Although the capacitor C and the Zener diodes ZD1 and ZD2 for the resonance purpose are not illustrated in FIG. 3, these elements may as well be provided as in the construction of FIG. 1.

Electric power received at the antenna 10 is supplied to the rectifier 11 as an alternating voltage. The rectifier 11 converts the alternating voltage supplied from the antenna 10 into a direct-current voltage. The voltage step-down circuit 41 steps down the direct-current voltage supplied from the rectifier 11, thereby generating an output voltage VDDF. The shunt regulator 42 controls a shunt resistor provided between the output voltage VDDF and the ground GND according to the change of the load so as to maintain the output voltage VDDF at constant voltage.

Figure 4:
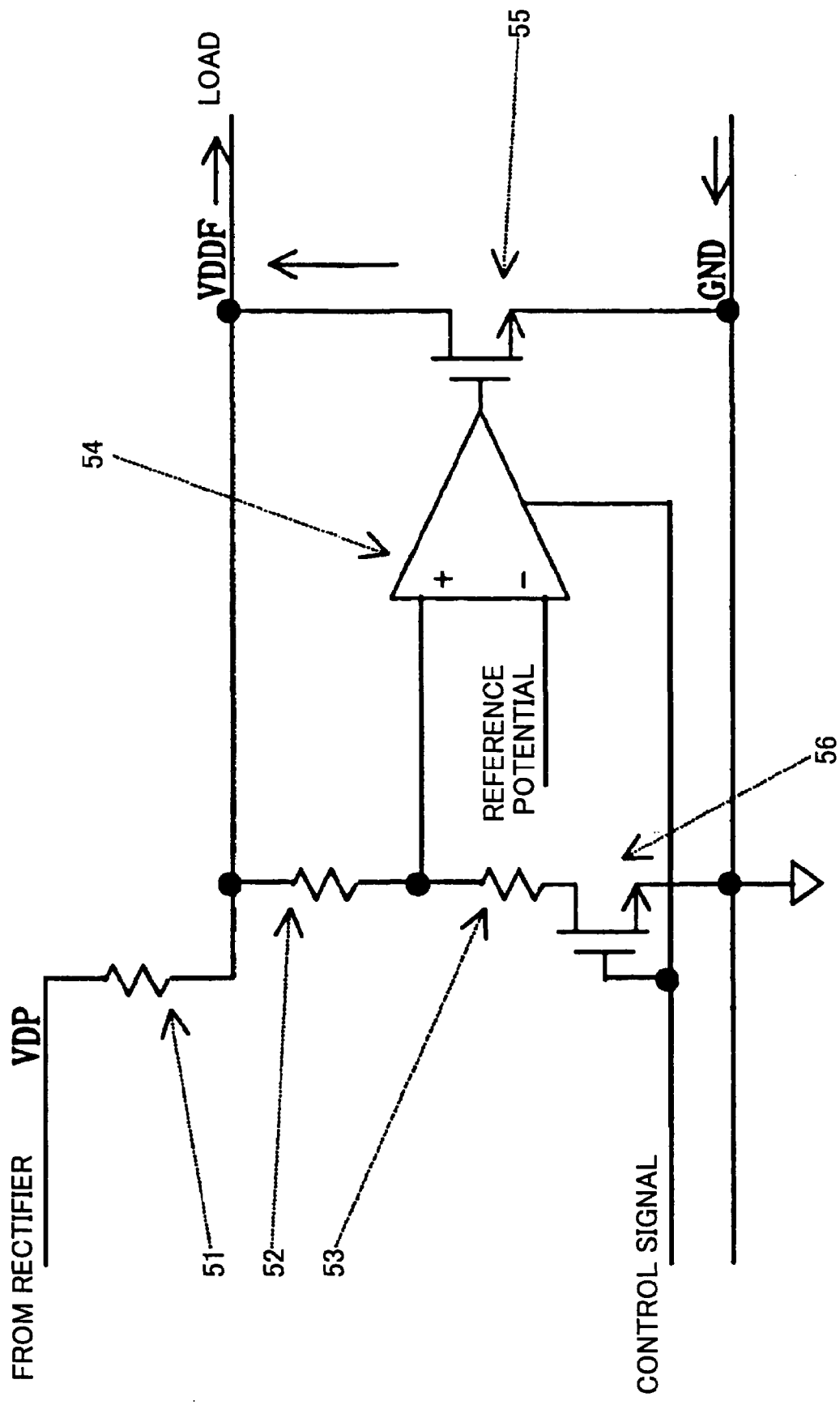
FIG. 4 is a circuit diagram showing a detailed circuit construction of a voltage step-down circuit and a shunt regulator shown in FIG. 3.

FIG. 4 is a circuit diagram showing a detailed circuit construction of the voltage step-down circuit 41 and the shunt regulator 42 shown in FIG. 3.

In FIG. 4, the voltage step-down circuit 41 includes a resistor 51. Moreover, the shunt regulator 42 includes resistors 52 and 53, an operational amplifier 54, and transistors 55 and 56.

The resistor 51 serving as the voltage step-down circuit 41 steps down the direct-current voltage VDP supplied from the rectifier 11 of FIG. 3, thereby generating the output voltage VDDF. The resistors 52 and 53 of the shunt regulator 42 divide the output voltage VDDF to provide a non-inverted input into the operational amplifier 54. An inverted input node of the operational amplifier 54 receives a reference potential. The operational amplifier 54 compares the divided potential with the reference potential. The operational amplifier 54 controls the gate voltage to make the transistor 55 less conductive if the divided potential is lower than reference potential, and controls the gate voltage to make the transistor 55 more conductive if the divided potential is higher than the reference voltage. With such feedback control by the operational amplifier 54, the voltage VDDF is adjusted to be constant.

In the regulator circuit shown in FIG. 3 and FIG. 4, the transistor 55 which controlled by the operational amplifier 54 of the shunt regulator 42 is provided in parallel with the load. If an increase in the load causes the output voltage VDDF to drop, the transistor 55 is controlled to be less conductive, thereby increasing an electric current supplied to the load. If a decrease in the load causes the output voltage VDDF to rise, the transistor 55 is controlled to be more conductive, thereby decreasing an electric current supplied to the load. With this provision, the ON resistance of the transistor 55 connected in parallel with the output voltage VDDF and serving as part of the load is changed, thereby controlling the output voltage VDDF appearing at one end of the transistor 55. If the size of the transistor 55 is sufficiently large, the response speed of the operational amplifier 54 may be increased to bring about a commensurate increase in the speed of voltage control. The operational amplifier 54 thus does not oscillate.

In this manner, the construction of the first embodiment of the invention as shown in FIG. 3 and FIG. 4 makes it possible to cope with a sudden change in the load by increasing the response speed of the operational amplifier 54. It is thus possible to provide stable power by keeping the output voltage VDDF constant against sudden changes in the load.

Figure 5:
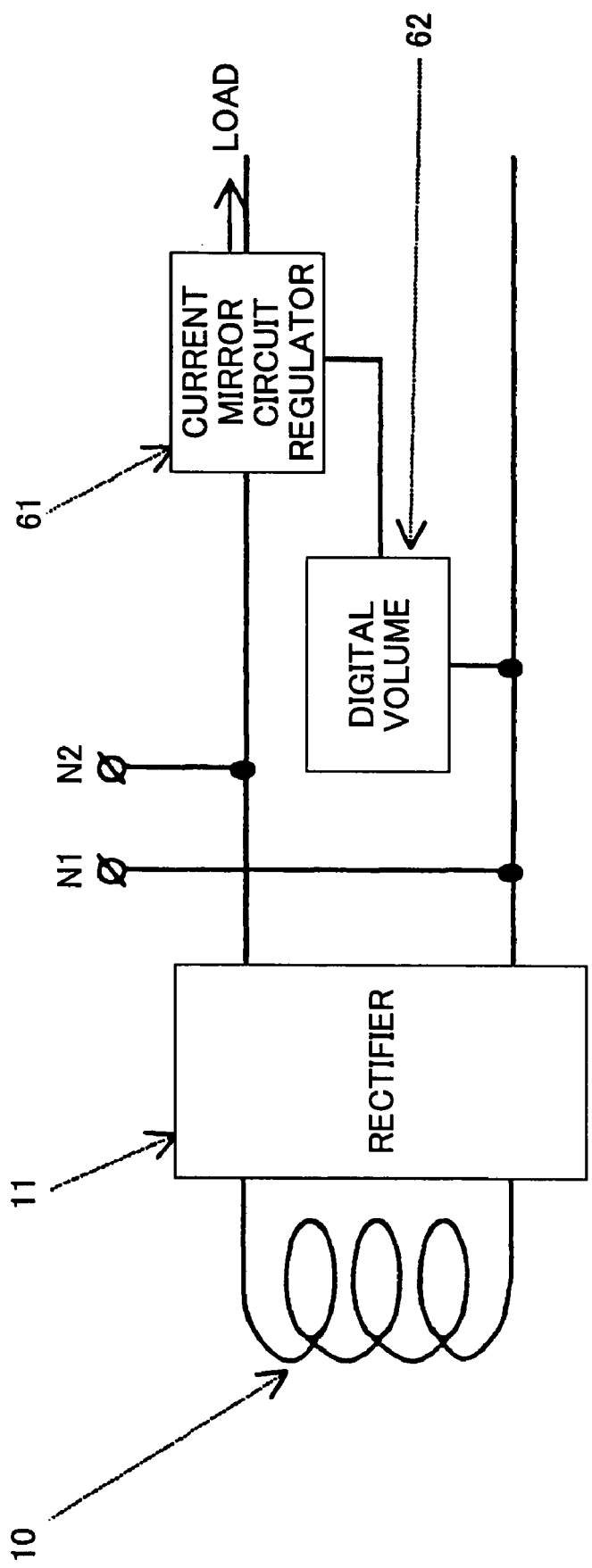
FIG. 5 is a block diagram showing a second embodiment of the power supply circuit according to the invention.

FIG. 5 is a block diagram showing a second embodiment of the power supply circuit according to the invention. In FIG. 5, the same elements as those of FIG. 1 are referred to by the same numerals, and a description thereof will be omitted.

The power supply circuit of FIG. 5 includes the antenna 10, the rectifier 11, a current mirror circuit regulator 61, and a digital volume 62. Although the capacitor C and the Zener diodes ZD1 and ZD2 for the resonance purpose are not illustrated in FIG. 53, these elements may as well be provided as in the construction of FIG. 1.

Electric power received at the antenna 10 is supplied to the rectifier 11 as an alternating voltage. The rectifier 11 converts the alternating voltage supplied from the antenna 10 into a direct-current voltage. The current mirror circuit regulator 61 serves to supply a predetermined amount of an electric current to the load by utilizing the principle of a current mirror circuit. The digital volume 62 controls the amount of an electric current supplied from the current mirror circuit regulator 61 to the load so as to achieve a constant current amount, and also adjusts the input voltage VDP to a proper voltage.

Figure 6:
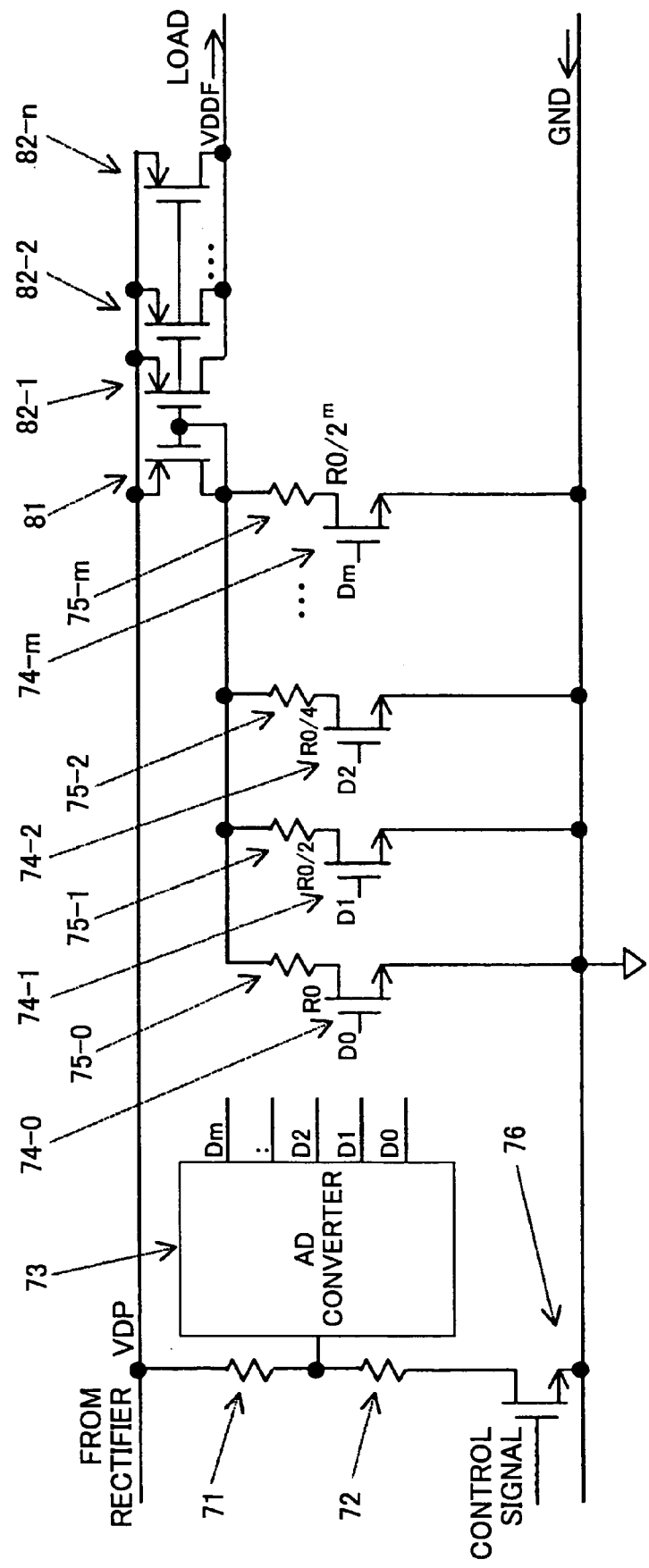
FIG. 6 is a circuit diagram showing a detailed circuit construction of the current mirror circuit regulator and the digital volume of FIG. 5.

FIG. 6 is a circuit diagram showing a detailed circuit construction of the current mirror circuit regulator 61 and the digital volume 62 of FIG. 5.

In FIG. 6, the current mirror circuit regulator 61 includes a transistor 81 and n transistors 82-1 through 82-n. A current mirror circuit is constructed by connecting together the gate of the transistor 81 and the gates of the transistors 82-1 through 82-n, so that an equal amount of an electric current flows through each transistor. If the amount of a current running through the transistor 81 is denoted as I, then, an electric current in a total amount of nI flows into the load.

The digital volume 62 includes resistors 71 and 72, an AD converter 73, transistors 74-0 through 74-m, resistors 75-0 through 75-m having respective resistances R0 through $R0/2^m$, and a transistor 76. The resistors 71 and 72 divide a direct-current voltage VDP supplied from the rectifier 11 of FIG. 5. The AD converter 73 converts the divided potential into a digital value comprised of D0 through Dm, and controls the ON/OFF of the transistors 74-0 through 74-m according to this digital value. With this provision, the resistors 75-0 through 75-m having respective resistances R0, R0/2, . . . , and $R0/(2^m)$ are selectively coupled to the gate-drain nodes of the transistor 81 of the current mirror circuit regulator 61 according to the digital value. The adjustment of combined resistance is made such that the higher the detected value of the direct-current voltage VDP (i.e., the higher the divided potential detected by the AD converter 73), the lower the combined resistance is. This feedback control makes it possible to keep the voltage VDP constant.

In the second embodiment of the invention shown in FIG. 5 and FIG. 6 as described above, the use of a current mirror circuit fixes the amount of an electric current supplied to the load to a predetermined amount regardless of changes in the load, and the digital volume 62 controls the input voltage VDP so as to keep it constant. Even when the load exhibits a sudden change, the current mirror circuit functions to keep constant the current supplied to the load, so that the input voltage VDP does not change. Moreover, the provision of the digital volume makes it possible to keep the input voltage VDP constant so as to provide stable power even if the electric power supplied from the antenna fluctuates.

In the construction described above, the digital volume 62 may be replaced by a resistor having a fixed resistance value, such that this resistor connects between the gate-drain nodes of the transistor 81 of the current mirror circuit regulator 61 and the ground potential GND. Such configuration is not able to avoid a change in the input voltage VDP in response to a change in the electric power supplied from the antenna. Because of the fixed-current supply function of the current mirror circuit, however, the input voltage VDP does not change in response to a change in the load.

Figure 7:
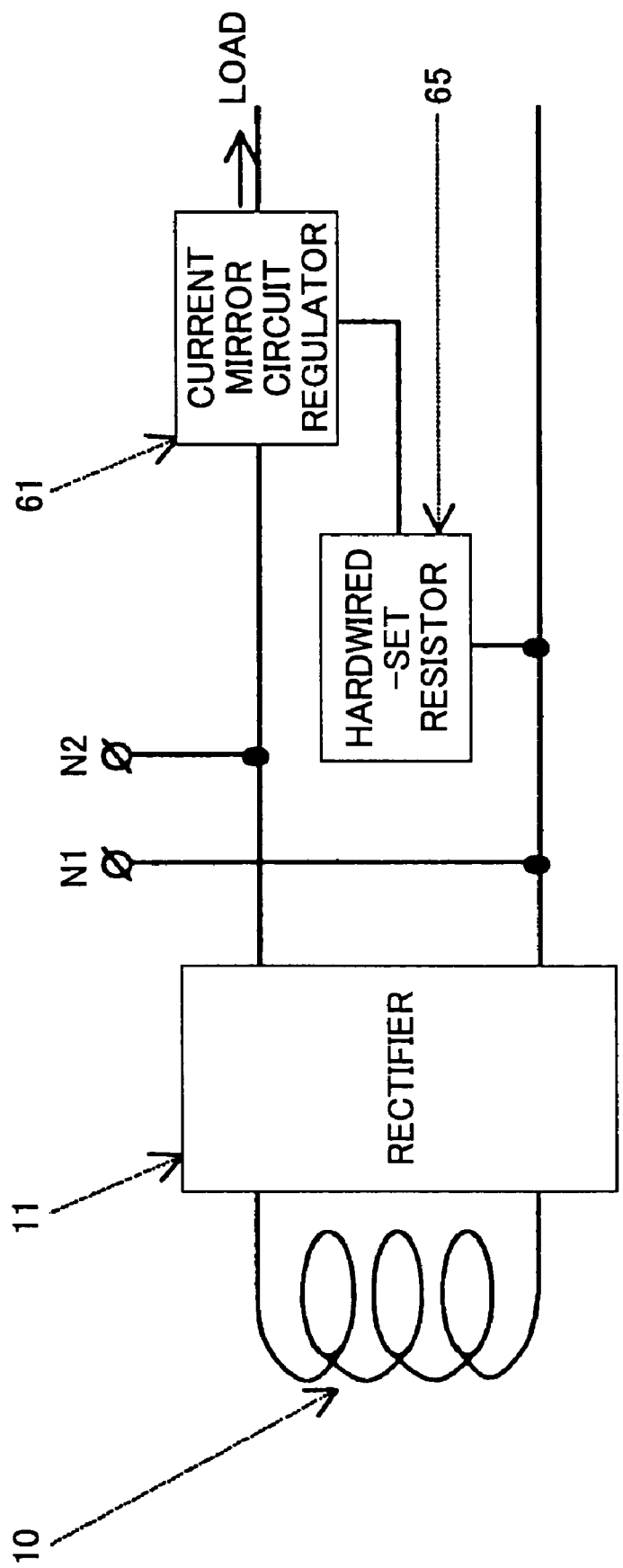
FIG. 7 is a block diagram showing a variation of the second embodiment of the power supply circuit according to the invention.

FIG. 7 is a block diagram showing a variation of the second embodiment of the power supply circuit according to the invention. In FIG. 7, the same elements as those of FIG. 5 are referred to by the same numerals, and a description thereof will be omitted.

In the variation of the second embodiment shown in FIG. 7, a hardwired-set resistor 65 is provided in place of the digital volume 62 of FIG. 5.

Figure 8:
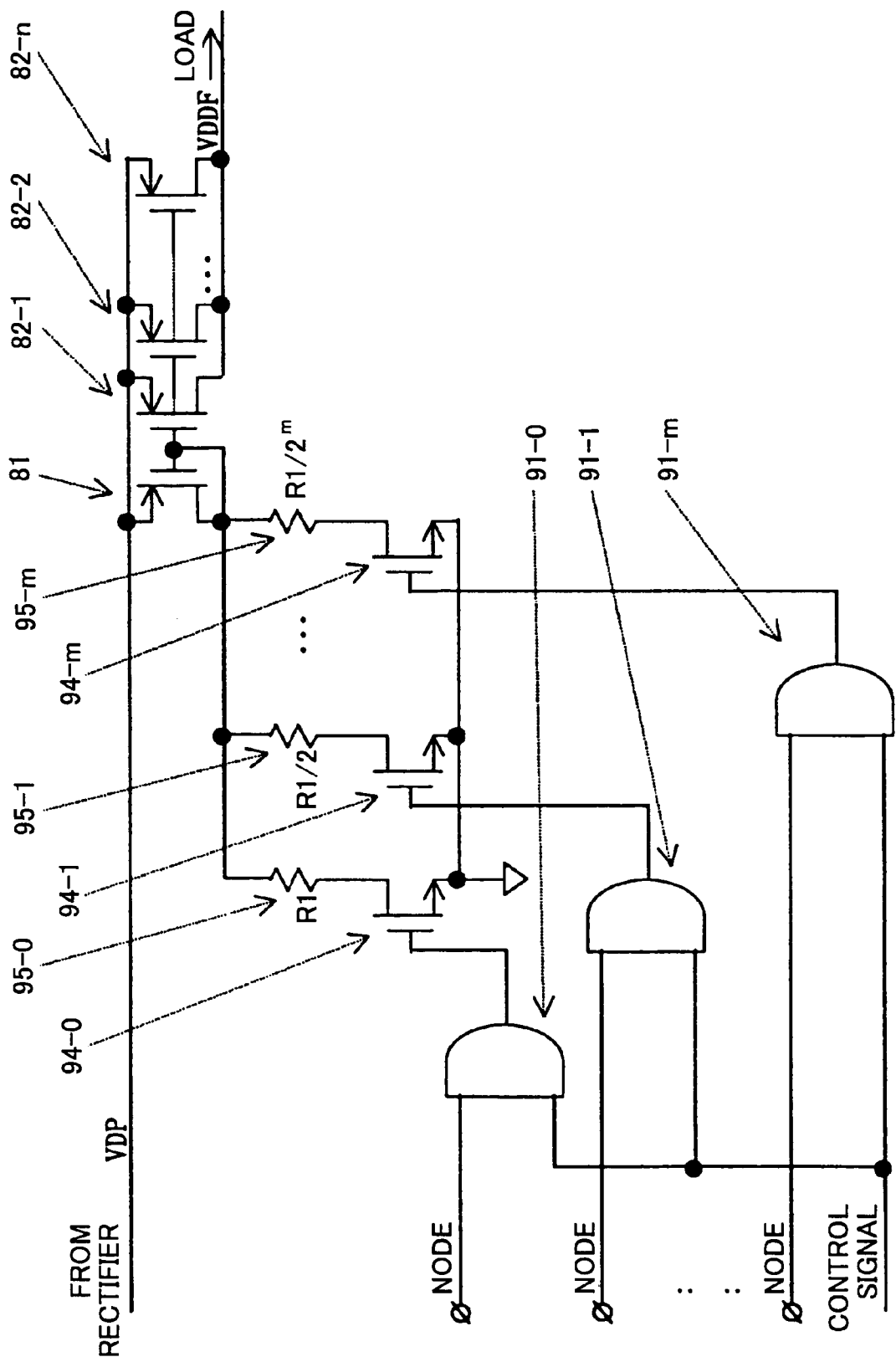
FIG. 8 is a circuit diagram showing a detailed circuit construction of the current mirror circuit regulator and the hardwired-set resistor of FIG. 7.

FIG. 8 is a circuit diagram showing a detailed circuit construction of the current mirror circuit regulator 61 and the hardwired-set resistor 65 of FIG. 7. In FIG. 8, the same elements as those of FIG. 6 are referred to by the same numerals, and a description thereof will be omitted.

In FIG. 8, the hardwired-set resistor 65 includes AND circuits 91-0 through 91-m, transistors 94-0 through 94-m, and resistors 95-0 through 95-m having respective resistances $R0$ through $R0/2^m$. One input of the AND circuits 91-0 through 91-m receives a respective predetermined setting value, and the other input thereof receives a control signal. When the control signal is HIGH, the ON/OFF of the transistors 94-0 through 94-m is controlled according to the predetermined setting values. With this provision, the resistors 95-0 through 95-m having respective resistances $R0$, $R0/2$, ..., and $R0/(2^m)$ are selectively coupled to one end of the transistor 81 of the current mirror circuit regulator 61 according to the setting values.

The setting values described above are predetermined by taking into account the amount of an electric current that is required by the load connected to the power supply circuit. Even when the load exhibits a sudden change, the current mirror circuit functions to keep constant the current supplied to the load, so that the input voltage VDP does not change.

In the variation of the second embodiment of the invention shown in FIG. 7 and FIG. 8 as described above, the use of a current mirror circuit fixes the amount of an electric current supplied to the load to a predetermined amount regardless of changes in the load, and the hardwired-set resistor 65 adjusts the electric current supplied to the load to a desired amount. This makes it possible to keep the input voltage VDP constant so as to provide stable power even if there is a sudden change in the load.

Figure 9:
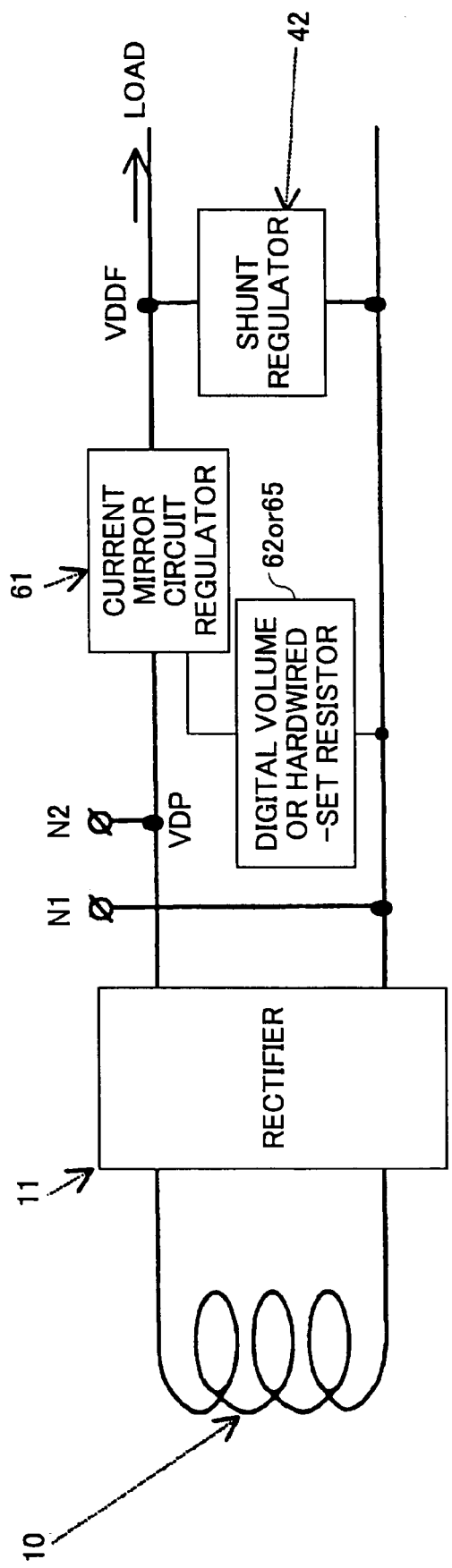
FIG. 9 is a block diagram showing a third embodiment of the power supply circuit according to the invention.

FIG. 9 is a block diagram showing a third embodiment of the power supply circuit according to the invention. In FIG. 9, the same elements as those of FIG. 1, FIG. 3, FIG. 5, and FIG. 7 are referred to by the same numerals, and a description thereof will be omitted.

The power supply circuit of FIG. 9 includes the antenna 10, the rectifier 11, the shunt regulator 42, the current mirror circuit regulator 61, and the digital volume 62 (or hardwired-set resistor 65). Although the capacitor C and the Zener diodes ZD1 and ZD2 for the resonance purpose are not illustrated in FIG. 9, these elements may as well be provided as in the construction of FIG. 1.

In the construction shown in FIG. 9, electric power received at the antenna 10 is supplied to the rectifier 11 as an alternating voltage. The rectifier 11 converts the alternating voltage supplied from the antenna 10 into a direct-current voltage. The current mirror circuit regulator 61 serves as a constant-current source and also as a voltage step-down circuit, and steps down the direct-current voltage supplied from the rectifier 11 so as to generate an output voltage VDDF. The shunt regulator 42 controls a shunt resistor provided between the output voltage VDDF and the ground GND according to the change of the load so as to maintain the output voltage VDDF at constant voltage.

Even if a sudden change in the load occurs, the shunt regulator 42 keeps the output voltage VDDF constant in the same manner as in the first embodiment, thereby providing stable electric power. Also in the same manner as in the second embodiment, due to the fixed-current supply function of the current mirror circuit regulator 61, the input voltage VDP does not change in response to a change in the load. Moreover, if the digital volume 62 is provided, feedback control by the digital volume 62 makes it possible to keep the input voltage VDP constant and provide stable electric power even in the presence of fluctuation of electric power supplied from the antenna.

Figure 10:
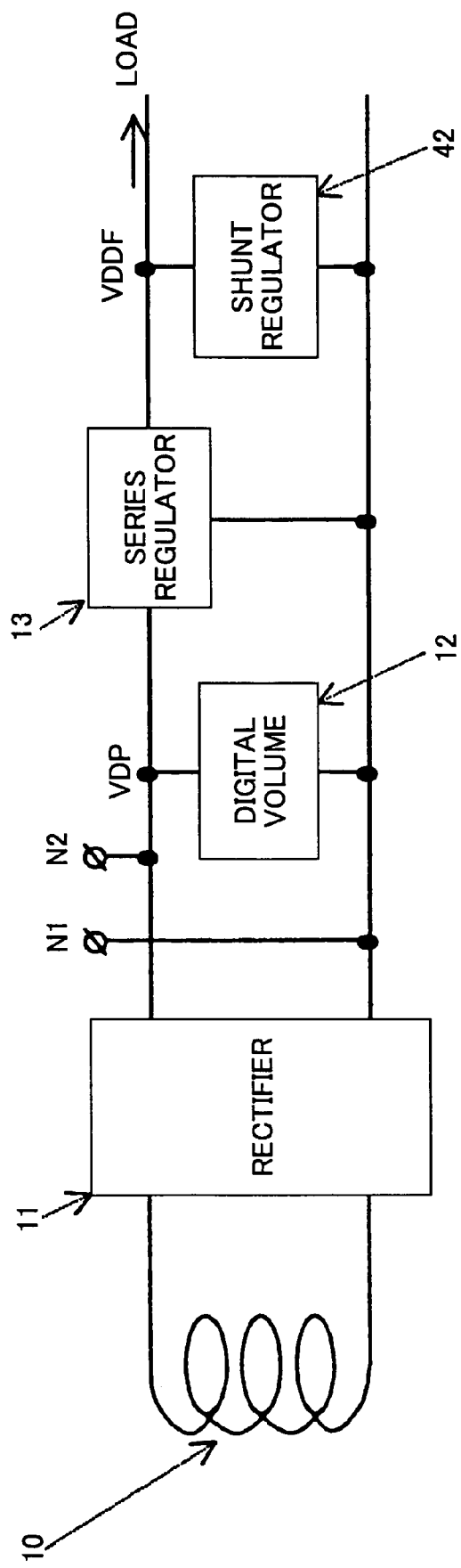
FIG. 10 is a block diagram showing a fourth embodiment of the power supply circuit according to the invention.

FIG. 10 is a block diagram showing a fourth embodiment of the power supply circuit according to the invention. In FIG. 10, the same elements as those of FIG. 1 and FIG. 3 are referred to by the same numerals, and a description thereof will be omitted.

The power supply circuit of FIG. 10 includes the antenna 10, the rectifier 11, the digital volume 12, the series regulator 13, and the shunt regulator 42. Although the capacitor C and the Zener diodes ZD1 and ZD2 for the resonance purpose are not illustrated in FIG. 10, these elements may as well be provided as in the construction of FIG. 1.

In the construction shown in FIG. 10, electric power received at the antenna 10 is supplied to the rectifier 11 as an alternating voltage. The rectifier 11 converts the alternating voltage supplied from the antenna 10 into a direct-current voltage. The digital volume 12 serves as a pseudo load to adjust the input voltage VDP to a proper voltage level. The series regulator 13 steps down the direct-current voltage supplied from the rectifier 11 so as to generate an output voltage VDDF, and attends to current control responsive to a load change, thereby supplying a constant direct current to the load. The shunt regulator 42 controls a shunt resistor provided between the output voltage VDDF and the ground GND according to a load change so as to maintain the output voltage VDDF at constant voltage.

In the fourth embodiment described above, the shunt regulator 42 is additionally provided to the related-art construction shown in FIG. 1. By using the operational amplifier 54 (refer to FIG. 4) that has sufficient response speed in the shunt regulator 42, it is possible to keep the output voltage VDDF constant and provide stable electric power in response to a sudden change in the load.

Figure 11:
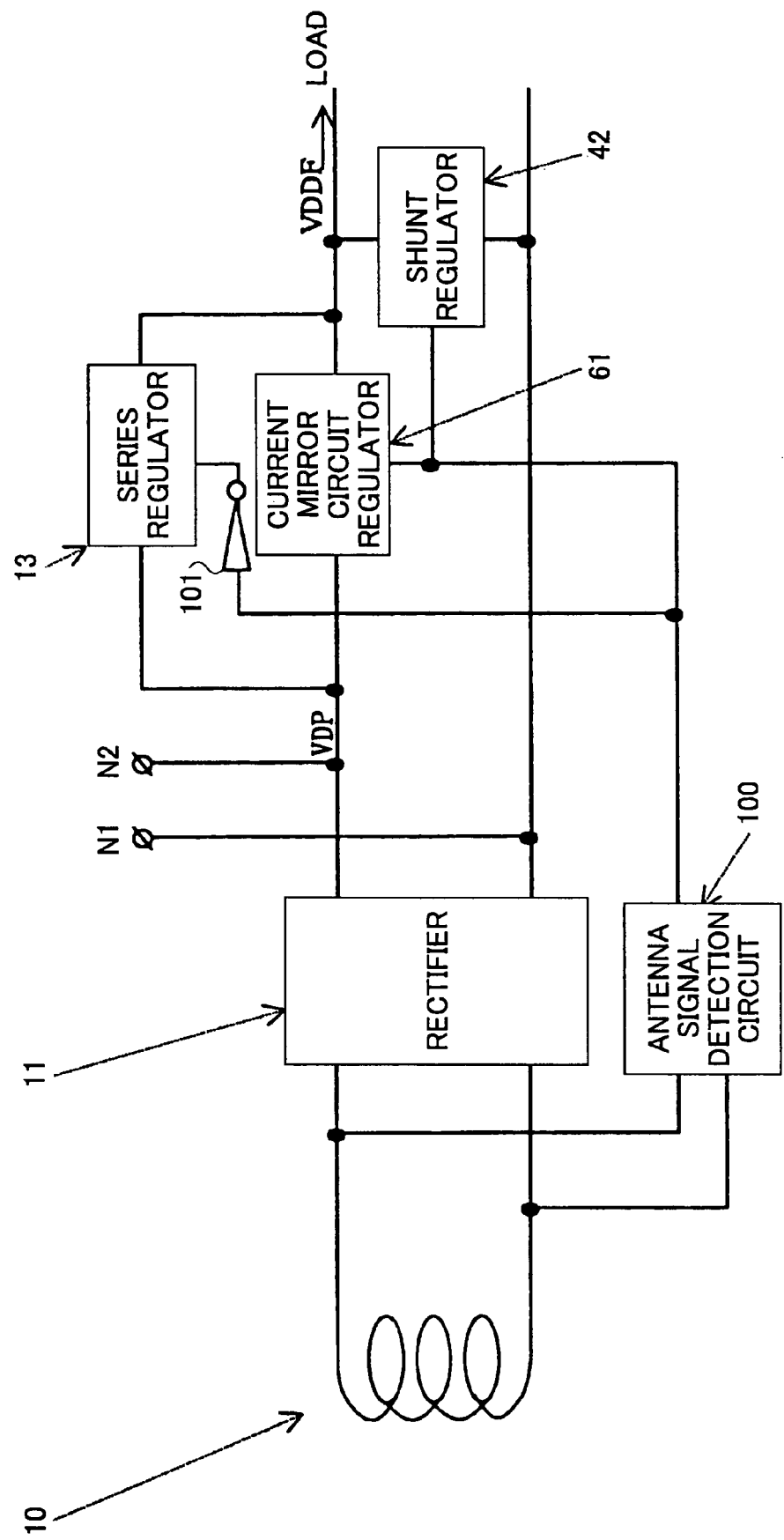
FIG. 11 is a block diagram showing a fifth embodiment of the power supply circuit according to the invention.

FIG. 11 is a block diagram showing a fifth embodiment of the power supply circuit according to the invention. In FIG. 11, the same elements as those of FIG. 1, FIG. 3, and FIG. 5 are referred to by the same numerals, and a description thereof will be omitted.

The power supply circuit of FIG. 11 includes the antenna 10, the rectifier 11, the series regulator 13, the shunt regulator 42, the current mirror circuit regulator 61, an antenna signal detection circuit 100, and an inverter 101. Although the capacitor C and the Zener diodes ZD1 and ZD2 for the resonance purpose are not illustrated in FIG. 11, these elements may as well be provided as in the construction of FIG. 1.

When an IC card equipped with the power supply circuit of FIG. 11 receives noncontact electric power supply through the antenna 10, the electric power received at the antenna 10 is supplied to the rectifier 11 as an alternating voltage. The rectifier 11 converts the alternating voltage supplied from the antenna 10 into a direct-current voltage. The antenna signal detection circuit 100 detects a signal from the antenna 10 to output a detection signal indicative of the presence of noncontact electric power supply. In response to the detection signal supplied from the antenna signal detection circuit 100 that indicates the presence of noncontact electric power supply, the shunt regulator 42 and the current mirror circuit regulator 61 start operation thereof while the series regulator 13 suspends its operation.

The current mirror circuit regulator 61 serves as a constant-current source and also as a voltage step-down circuit, and steps down the direct-current voltage supplied from the rectifier 11 so as to generate an output voltage VDDF. The shunt regulator 42 controls a shunt resistor provided between the output voltage VDDF and the ground GND according to the change of the load so as to maintain the output voltage VDDF at constant voltage. Even if a sudden change in the load occurs, the shunt regulator 42 keeps the output voltage VDDF constant in the same manner as in the first embodiment, thereby providing stable electric power. Also in the same manner as in the second embodiment, due to the fixed-current supply function of the current mirror circuit regulator 61, the input voltage VDP does not change in response to a change in the load.

If the IC card equipped with the power supply circuit of FIG. 11 receives contact electric power supply through the contact terminals N1 and N2 rather than noncontact electric power supply through the antenna 10, the antenna signal detection circuit 100 does not detect a signal from the antenna 10, and thus does not output the detection signal indicative of noncontact electric power supply. Since the detection signal indicative of noncontact electric power supply is not asserted, the shunt regulator 42 and the current mirror circuit regulator 61 are put in the dormant state while the series regulator 13 is put in the operating state.

In this case, the series regulator 13 steps down the direct-current voltage supplied from the contact terminals N1 and N2 so as to generate the output voltage VDDF, and attends to current control responsive to a load change to control the output voltage VDDF to keep it constant. The response speed of the series regulator 13 may be so slow that the control of the voltage VDDF does not follow changes in the load. Even in such a case, the voltage VDP does not drop since the input voltage VDP is supplied from the contact terminals N1 and N2.

Where the current mirror circuit regulator 61 is used, an electric current may flow all the time in the current mirror circuit even during a period in which load circuitry is in a suspended state, resulting in an excessive current being consumed. With the construction of the fifth embodiment shown in FIG. 11, if contact electric power supply which insures stable input voltage is provided, the current mirror circuit regulator 61 and the shunt regulator 42 are suspended while the series regulator 13 attends to voltage control. This successfully avoids the consumption of an excessive electric current.

Figure 12:
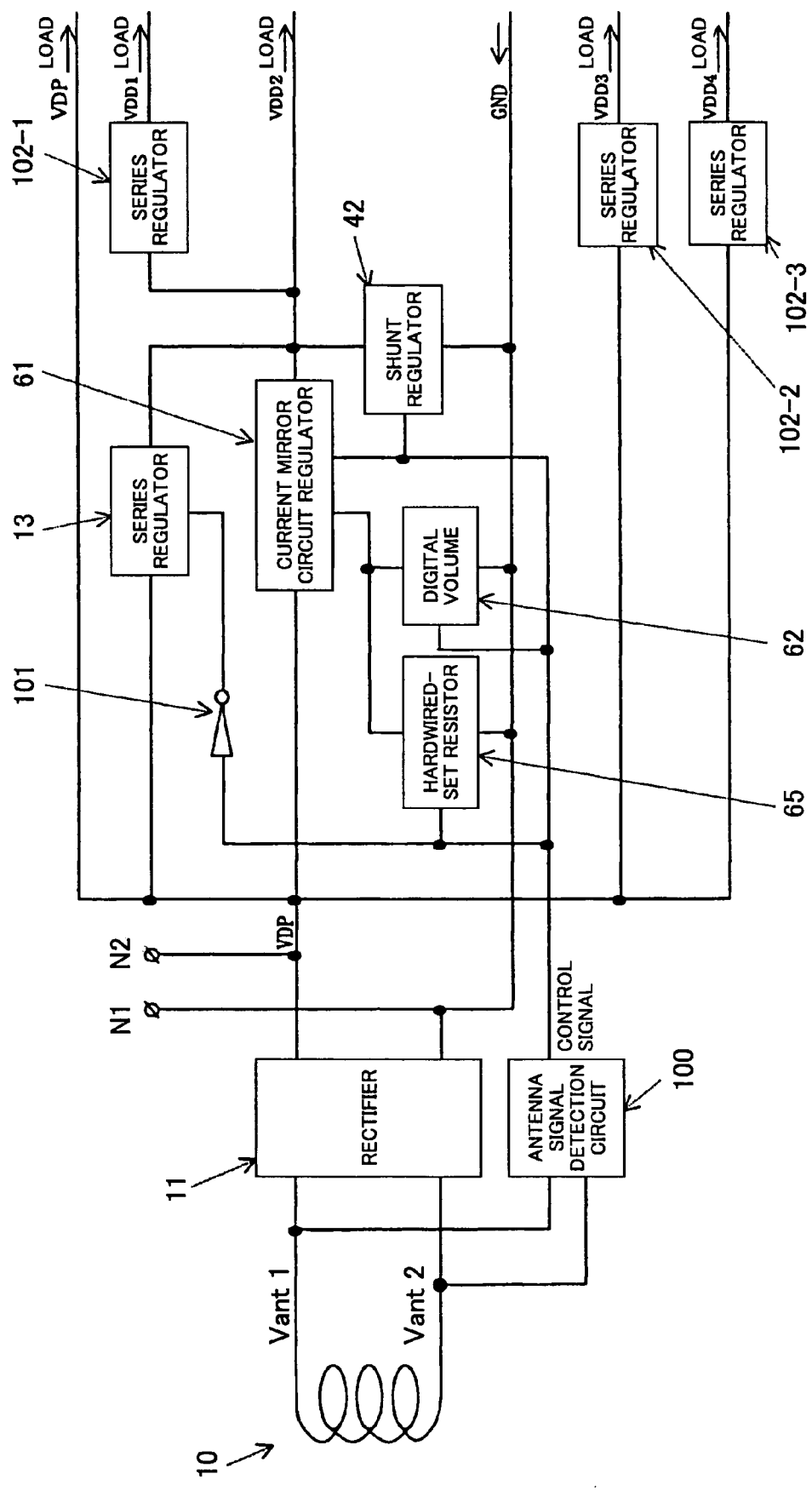
FIG. 12 is a block diagram showing a sixth embodiment of the power supply circuit according to the invention.

FIG. 12 is a block diagram showing a sixth embodiment of the power supply circuit according to the invention. In FIG. 12, the same elements as those of FIG. 11, FIG. 5, and FIG. 7 are referred to by the same numerals, and a description thereof will be omitted.

The power supply circuit of FIG. 12 includes the antenna 10, the rectifier 11, the series regulator 13, the shunt regulator 42, the current mirror circuit regulator 61, the digital volume 62, the hardwired-set resistor 65, the antenna signal detection circuit 100, the inverter 101, and series regulators 102-1 through 102-3. Although the capacitor C and the Zener diodes ZD1 and ZD2 for the resonance purpose are not illustrated in FIG. 12, these elements may as well be provided as in the construction of FIG. 1.

The construction of FIG. 12 is the same as the construction of FIG. 11 as far as the basic principle of operation is concerned. That is, the use of the series regulator 13 and the use of the current mirror circuit regulator 61 are switched, depending on whether the case of noncontact electric power supply through the antenna 10 or the case of contact electric power supply through the contact terminals N1 and N2. The construction of FIG. 12 is provided with the digital volume 62 and the hardwired-set resistor 65 in addition to the construction of FIG. 11. According to needs, the digital volume 62 may attend to the control of the input voltage VDP, or the hardwired-set resistor 65 may set an electric current for the current mirror circuit regulator 61.

The series regulators 102-1 through 102-3 have the same construction as the series regulator 13, and may be used to supply different voltages to different load circuits. Moreover, as illustrated in FIG. 12, there may be a path provided to supply the input voltage VDP directly to the load circuitry.

According to the sixth embodiment described above, the input voltage VDP is controlled to be constant regardless of load changes in the case of noncontact electric power supply, and the output voltages VDD1 and VDD2 are controlled to be constant even under the presence of sudden load changes. In the case of contact electric power supply, the operation of the current mirror circuit regulator 61 is suspended, thereby avoiding excessive current consumption. Moreover, it suffices to provide the output voltages VDD3 and VDD4 to the load that is expected to show small load changes. In this manner, flexible power supply is provided according to needs.

Figure 13:
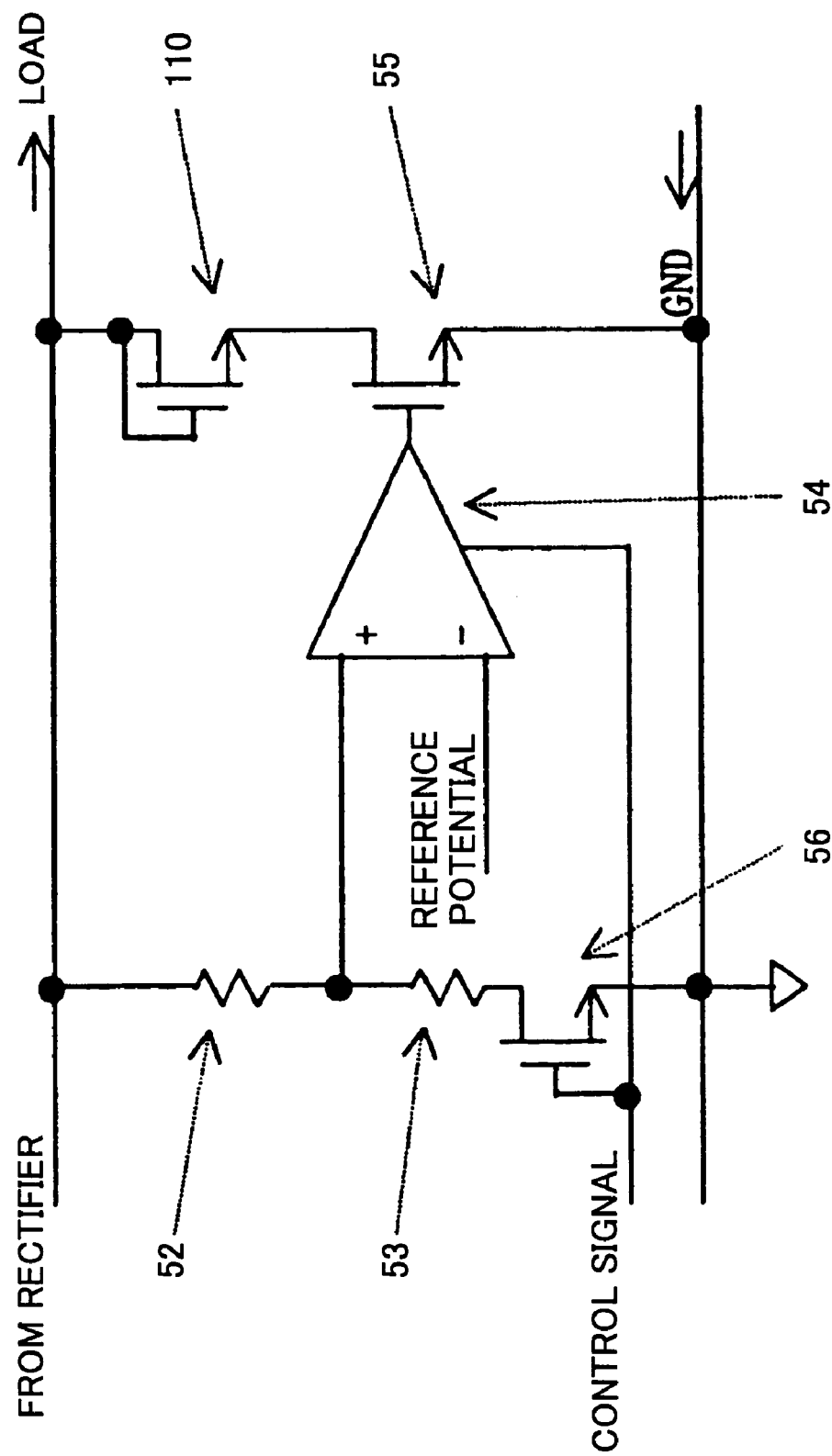
FIG. 13 is a circuit diagram showing a variation of the shunt regulator used in the invention.

FIG. 13 is a circuit diagram showing a variation of the shunt regulator used in the invention. In FIG. 13, the same elements as those of FIG. 4 are referred to by the same numerals, and a description thereof will be omitted.

The shunt regulator of FIG. 13 is provided with a transistor 110 connected in series with the transistor 55 in addition to the construction of the shunt regulator 42 of FIG. 4. With this provision, the range of a gate voltage is narrowed that is used when adjusting the gate voltage of the transistor 55 by the operational amplifier 54. This makes it possible to further increase the speed of voltage adjustment of the shunt regulator.

FIGS. 14A and 14B are block diagrams showing the construction of an IC card in which the regulator of the invention is incorporated.

An IC card 200 shown in FIG. 14A includes the antenna 10, a contact/contactless I/F circuit 201, a memory unit 202, an OS unit 203, an encryption circuit 204, a logic circuit 205, a CPU 206, and a contact terminal 207. The antenna 10 is provided for the purpose of receiving electric power and signals through noncontact means. The contact terminal 207 is provided for the purpose of receiving electric power and signals through contact means. The contact/contactless I/F circuit 201 performs power supply voltage generation, demodulation operation, etc. The memory unit 202, the OS unit 203, the encryption circuit 204, the logic circuit 205, and the CPU 206 together form a circuit core unit that performs various processing according to the application in which the IC card is used.

FIG. 14B shows the construction of the contact/contactless I/F circuit 201. The contact/contactless I/F circuit 201 includes the resonance capacitor C, the rectification circuit 11, a regulator 210 according to the invention, a reset circuit 211, a voltage detection circuit 212, a clock extraction circuit 213, a demodulation circuit 214, and a load circuit 215. The power supply voltage generated by the regulator 210 is smoothed out by the smoothing capacitor 216 for provision to each circuit portion of the IC card 200.

As shown in FIG. 14B, signals received by the antenna 10 are supplied to the clock extraction circuit 213, the demodulation circuit 214, etc. Signals received by the antenna 10 include not only electric waves for power supply but also AM modulated signals, clock signals, etc., which are superimposed on the electric waves for communication purposes. In order to avoid the loss of modulated signals, therefore, the response speed of the digital volume 12 of FIG. 1 or the like needs to be set to a rather slow speed.

The regulator 210 according to the invention is configured as was described in connection with the embodiments, so as to prevent the input-side direct-current voltage from fluctuating in response to a sudden change in the load. This makes it possible to supply a stable power supply voltage to each circuit potion of the IC card 200.

Further, the present invention is not limited to these embodiments, but various variations and modifications may be made without departing from the scope of the present invention.

What is claimed is:

1. A power supply circuit for supplying power to a load, comprising:
   an antenna which receives electric power;
   a rectifier coupled to the antenna and configured to convert an alternating voltage supplied from the antenna into a direct-current voltage;
   a voltage step-down circuit which steps down the direct-current voltage to generate an output voltage for provision to the load;
   a regulator which controls a resistance connected between the output voltage and a ground voltage in parallel with the load, thereby controlling a voltage level of said output voltage,
   wherein said regulator includes:
   an operational amplifier which operates in response to the voltage level of said output voltage; and
   a transistor which is connected between the output voltage and the ground voltage, and receives an output of said operation amplifier at a gate node thereof, said transistor having an on-resistance that is controlled in response to the output of said operational amplifier.

2. A power supply circuit for supplying power to a load, comprising:
   an antenna which receives electric power;
   a rectifier coupled to the antenna and configured to convert an alternating voltage supplied from the antenna into a direct-current voltage;
   a voltage step-down circuit which steps down the direct-current voltage to generate an output voltage for provision to the load;
   a regulator which controls a resistance connected between the output voltage and a around voltage in parallel with the load, thereby controlling a voltage level of said output voltage,
   wherein said regulator includes:
   an operational amplifier which operates in response to the voltage level of said output voltage; and
   first and second transistors which are connected in series between the output voltage and the ground voltage, the second transistor receiving an output of said operation amplifier at a gate node thereof and having an on-resistance that is controlled in response to the output of said operational amplifier.

3. A power supply circuit for supplying power to a load, comprising:
   an antenna which receives electric power;
   a rectifier coupled to the antenna and configured to convert an alternating voltage supplied from the antenna into a direct-current voltage;
   a voltage step-down circuit which steps down the direct-current voltage to generate an output voltage for provision to the load;
   a regulator which controls a resistance connected between the output voltage and a ground voltage in parallel with the load, thereby controlling a voltage level of said output voltage,
   wherein said voltage step-down circuit is a resistor.

4. A power supply circuit for supplying power to a load, comprising:
   an antenna which receives electric power;
   a rectifier coupled to the antenna and configured to convert an alternating voltage supplied from the antenna into a direct-current voltage;
   a voltage step-down circuit which steps down the direct-current voltage to generate an output voltage for provision to the load;
   a regulator which controls a resistance connected between the output voltage and a around voltage in parallel with the load, thereby controlling a voltage level of said output voltage,
   wherein said voltage step-down circuit is a current mirror circuit that supplies to the load a constant electric current responsive to the direct-current voltage.

5. The power supply circuit as claimed in claim 4, wherein said current mirror circuit includes:
   a first transistor which allows passage of a predetermined amount of an electric current responsive to the direct-current voltage; and
   at least one second transistor which allows passage of an electric current in an identical amount to the predetermined amount of the electric current,
   wherein said power supply circuit further comprises a setting circuit which controls the amount of the electric current running through said first transistor.

6. The power supply circuit as claimed in claim 4, further comprising:
   a series regulator which is provided in parallel with said current mirror circuit that is said voltage step-down circuit;
   an antenna signal detection circuit which asserts a detection signal in response to a detection of a signal supplied from the antenna; and
   contact power supply terminals which come in contact with external terminals to receive electric power,
   wherein said current mirror circuit and said series regulator are put in an operating state and a dormant state, respectively, in response to the assertion of the detection signal, and are put in a dormant state and an operating state, respectively, in response to non-assertion of the detection signal.

7. A power supply circuit for supplying power to a load, comprising:
   an antenna which receives electric power;
   a rectifier coupled to the antenna and configured to convert an alternating voltage supplied from the antenna into a direct-current voltage;
   a voltage step-down circuit which steps down the direct-current voltage to generate an output voltage for provision to the load;
   a regulator which controls a resistance connected between the output voltage and a around voltage in parallel with the load, thereby controlling a voltage level of said output voltage,
   wherein said voltage step-down circuit is a series regulator which controls a conductive state of a transistor that is connected in series with the load.

8. A power supply circuit for supplying power to a load, comprising:
   an antenna which receives electric power;
   a rectifier coupled to the antenna and configured to convert an alternating voltage supplied from the antenna into a direct-current voltage;
   a voltage step-down circuit which steps down the direct-current voltage to generate an output voltage for provision to the load;
   a regulator which controls a resistance connected between the output voltage and a ground voltage in parallel with the load, thereby controlling a voltage level of said output voltage,
   further comprising a digital volume that controls the direct-current voltage such as to keep the direct-current voltage constant.

* * * * *